(12) United States Patent
Arai

(10) Patent No.: US 12,511,531 B2
(45) Date of Patent: Dec. 30, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hiroshi Arai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1215 days.

(21) Appl. No.: 17/124,106

(22) Filed: Dec. 16, 2020

(65) Prior Publication Data

US 2021/0192393 A1 Jun. 24, 2021

(30) Foreign Application Priority Data

Dec. 20, 2019 (JP) ................. 2019-230276

(51) Int. Cl.
*G06V 10/774* (2022.01)
*G06F 18/21* (2023.01)
*G06F 18/214* (2023.01)
*G06N 3/08* (2023.01)
*G06N 20/00* (2019.01)
*G06V 10/44* (2022.01)
*G06V 10/778* (2022.01)
*G06V 10/82* (2022.01)

(52) U.S. Cl.
CPC ............. *G06N 3/08* (2013.01); *G06N 20/00* (2019.01); *G06V 10/454* (2022.01); *G06V 10/774* (2022.01); *G06V 10/7796* (2022.01); *G06V 10/82* (2022.01); *G06F 18/2148* (2023.01); *G06F 18/2193* (2023.01)

(58) Field of Classification Search
USPC .......................................... 706/11
See application file for complete search history.

(56) References Cited

U.S. PATENT DOCUMENTS

| | | | | |
|---|---|---|---|---|
| 6,453,315 B1 * | 9/2002 | Weissman | ........... | G06F 16/3338 |
| | | | | 707/999.005 |
| 9,235,573 B2 * | 1/2016 | Danielyan | ............... | G06F 40/55 |
| 9,390,086 B2 * | 7/2016 | Lisuk | ................... | G06F 40/117 |
| 2006/0253274 A1 | 11/2006 | Miller | | |

(Continued)

FOREIGN PATENT DOCUMENTS

| CN | 106782560 A | 5/2017 |
|---|---|---|
| CN | 108874772 A | 11/2018 |

(Continued)

*Primary Examiner* — Omar F Fernandez Rivas
*Assistant Examiner* — Em N Trieu
(74) *Attorney, Agent, or Firm* — Canon U.S.A., Inc., Division IP Division

(57) ABSTRACT

An information processing apparatus is provided and includes an obtaining unit obtains an estimation result of a score representing a likelihood for each of a first candidate and a second candidate for a label to be added as an annotation to data to be annotated. A control unit controls processing for displaying, depending on the score for each of the first candidate and the second candidate, first display information and second display information through an output unit, the first display information indicating a display position associated with the first candidate, the second display information indicating a display position associated with the second candidate.

19 Claims, 7 Drawing Sheets

(56) References Cited

U.S. PATENT DOCUMENTS

| | | | |
|---|---|---|---|
| 2011/0193704 A1* | 8/2011 | Harper | A61B 5/145 |
| | | | 340/505 |
| 2014/0280109 A1* | 9/2014 | Zomet | G06F 16/3344 |
| | | | 707/728 |
| 2016/0080643 A1* | 3/2016 | Kimura | G03B 17/18 |
| | | | 348/207.1 |
| 2016/0180249 A1* | 6/2016 | Britt | G06N 20/00 |
| | | | 706/12 |
| 2016/0306783 A1 | 10/2016 | Wu | |
| 2017/0011773 A1* | 1/2017 | Lee | H04N 5/9201 |
| 2017/0139664 A1* | 5/2017 | Park | H01R 24/60 |
| 2018/0011830 A1* | 1/2018 | Iida | G06F 40/268 |
| 2019/0244113 A1* | 8/2019 | Ramos | G06F 3/04847 |

FOREIGN PATENT DOCUMENTS

| | | | | |
|---|---|---|---|---|
| CN | 110232192 A | 9/2019 | | |
| CN | 110490236 A | 11/2019 | | |
| JP | 2014-147063 A | 8/2014 | | |
| JP | 6074820 | 7/2016 | | |
| JP | 2017-134694 A | 8/2017 | | |
| JP | 2019101535 A | 6/2019 | | |
| WO | WO-2020096635 A1 * | 5/2020 | | G06V 30/40 |

* cited by examiner

INFORMATION PROCESSING APPARATUS, INFORMATION PROCESSING METHOD, AND STORAGE MEDIUM

BACKGROUND

Field

The present disclosure relates to a technique for creating learning data used for machine learning.

Description of the Related Art

As a program for creating learning data used for machine learning, an annotation tool for adding correct answer information (correct answer label) to be learned to target data is used. The annotation tool may be equipped with, for example, a functional group for reducing a work load on a user (i.e., a functional group for assisting a user) in creating learning data. Example of such a function include a function of extracting candidates for information to be added as an annotation by analyzing data to be annotated using a trained model constructed for similar tasks based on preliminary machine learning.

As an example of a technique related to such an annotation tool, Japanese Patent No. 6074820 discusses a technique for controlling a display sequence of candidates for information (label) to be added as an annotation when the candidates are displayed. Japanese Patent Laid-Open No. 2019-101535 discusses an example of a technique for determining information to be added as an annotation.

SUMMARY

According to one embodiment of the present disclosure, an information processing apparatus is provided and includes an obtaining unit configured to obtain an estimation result of a score representing a likelihood for each of a first candidate and a second candidate for a label to be added as an annotation to data to be annotated; and a control unit configured to control processing for displaying, depending on the score for each of the first candidate and the second candidate, first display information and second display information through an output unit, the first display information indicating a display position associated with the first candidate, the second display information indicating a display position associated with the second candidate.

According to another embodiment of the present disclosure, an information processing method is provided and includes obtaining an estimation result of a score representing a likelihood for each of a first candidate and a second candidate for a label to be added as an annotation to data to be annotated; and controlling processing for displaying, depending on the score for each of the first candidate and the second candidate, first display information and second display information through an output unit, the first display information indicating a display position associated with the first candidate, the second display information indicating a display position associated with the second candidate.

According to still another embodiment of the present disclosure, a non-transitory computer-readable storage medium that stores instructions that, when executed by a computer, causes the computer to perform a method, the method comprising: obtaining an estimation result of a score representing a likelihood for each of a first candidate and a second candidate for a label to be added as an annotation to data to be annotated; and controlling processing for displaying, depending on the score for each of the first candidate and the second candidate, first display information and second display information through an output unit, the first display information indicating a display position associated with the first candidate, the second display information indicating a display position associated with the second candidate.

Further features of the present disclosure will become apparent from the following description of exemplary embodiments (with reference to the attached drawings).

DESCRIPTION OF THE EMBODIMENTS

Figure 1:
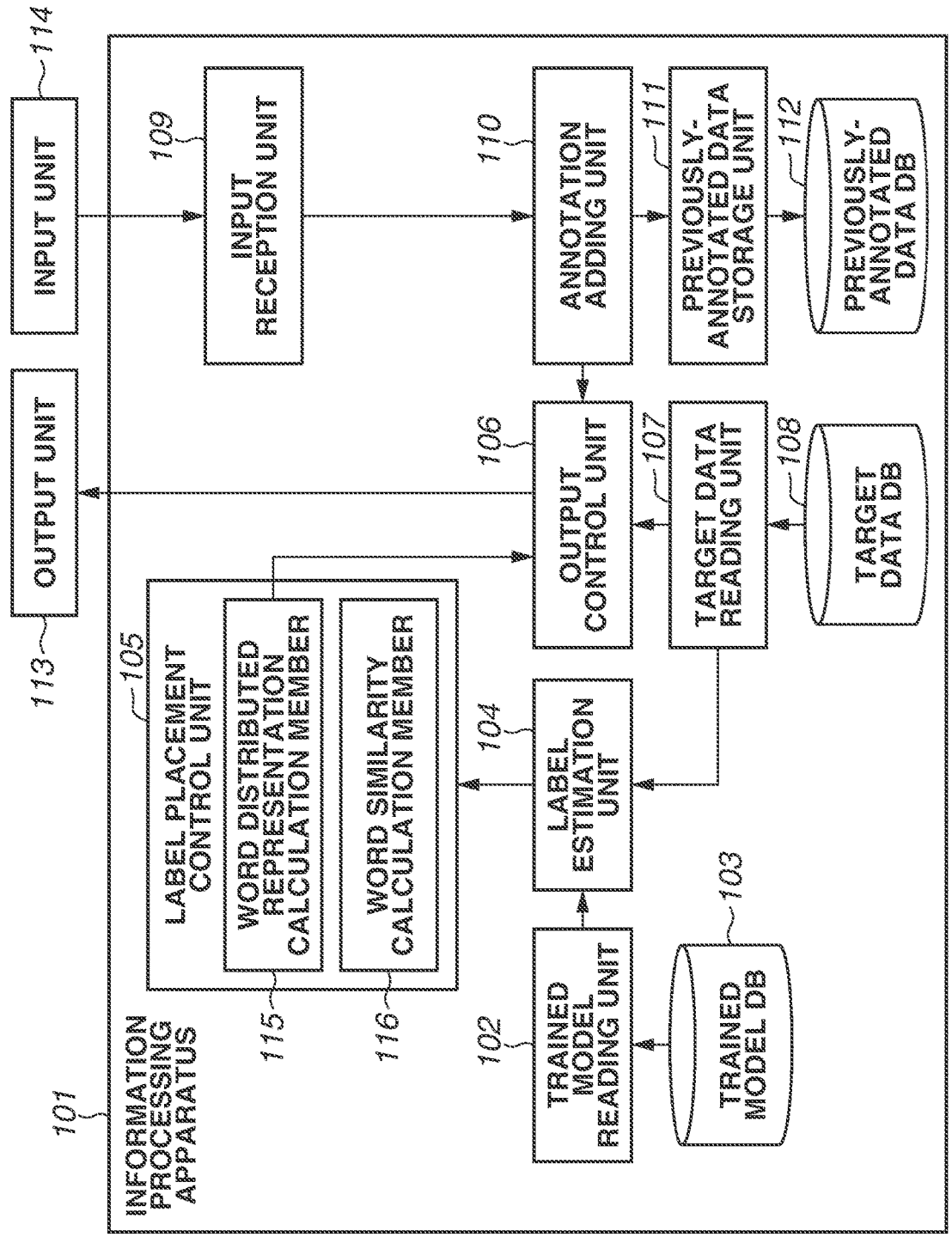
FIG. 1 is a block diagram illustrating an example of a functional configuration of an information processing apparatus.

Hereinafter, embodiments will be described in detail with reference to the attached drawings. Note, the following embodiments are not intended to limit the scope of the claims. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

In a case where learning data used for machine learning is created by adding a label as an annotation to target data, a situation is assumed in which a user accidentally selects a wrong label to be added. If learning data generated when the wrong label is accidentally selected is used for machine learning, the accuracy of prediction (or estimation, identification, recognition, etc.) of input data using a trained model constructed based on the machine learning may be degraded. In such a case, a label with a low likelihood is accidentally added to the target data as a label representing the data. It is thereby highly likely that the accuracy of prediction of input data using the above-described trained model may be degraded.

According to an exemplary embodiment of the present disclosure, it is possible to assist a user to select a label to be added as an annotation in a preferable manner.

<Outline of Annotation>

Supervised learning is an example of a technique for training of a machine learning model (in other words, construction of a machine learning model) based on so-called machine learning. In supervised learning, a data set is used to construct a machine learning model. The data set includes learning data in which data to be input to a learning model and a correct answer label to be predicted based on the data are associated. If the data set is not present or insufficient to construct a machine learning model, the data set is constructed by an annotation operation for adding a correct answer label as an annotation to the data, for example, after the data to be input is collected. An annotation tool having a function for assisting a user to perform the operation of adding the correct answer label to the data may be used to facilitate the user's operation during the annotation operation.

The annotation tool receives, from a user, a designation of a correct answer label to be added as an annotation to data, such as an image or document, to be annotated (the data is hereinafter also referred to as "target data") after presenting the target data to the user. The annotation tool generates learning data to be included in a data set by adding the correct answer label designated by the user to the target data as the annotation.

Various types of annotation tools include a tool that uses a machine learning model constructed based on preliminary machine learning (hereinafter also referred to as a "trained model") so as to effectively perform the above-described label adding operation of adding a correct answer label to the target data. As a specific example, a tool using a trained model causes the trained model to analyze target data, thereby causing the trained model to extract candidates for a label to be added as an annotation to the target data and to present the extracted candidates for the label to the user. This enables the user to select a candidate to be added as the correct answer label to the target data from among the candidates for the label presented from the annotation tool.

Assume herein that a label to be added as an annotation to target data includes at least character information.

Examples of a method of presenting a series of extracted candidates by the annotation tool described above include, for example, a method of presenting a series of candidates in a predetermined order and a method of presenting a series of candidates in descending order of score obtained as a result of prediction by the trained model.

In contrast, when a series of extracted candidates is presented in a predetermined order, a candidate for a label that is less relevant to target data to be annotated (in other words, a candidate for a label with a low likelihood) may be presented at a position close to the target data. In such a case, a situation is assumed in which the user is induced to select a candidate for a label that is less relevant to target data as the correct answer label to be added as an annotation to the target data. Thus, if learning data to which the label that is less relevant to the target model is included in a data set, the accuracy of prediction by the machine learning model constructed using the data set may be lower than the accuracy that is supposed to be achieved.

When a series of extracted candidates is presented in descending order of score obtained as a result of prediction by the trained model, it may be difficult for the user to recognize whether the trained model can extract candidates with a certain degree of certainty. In such a case, a situation is assumed in which the user may simply determine that a first candidate (e.g., a candidate with a highest score) to be an appropriate label without much consideration.

In the annotation operation, learning data dedicated to a specific domain may be created. Under such circumstances, it may be difficult for the trained model to perform prediction with a high degree of certainty. If the user simply determines the first candidate for the label to be a more appropriate label without much consideration and selects the first candidate under such circumstances, a candidate that is less relevant to target data may be selected. Even in this case, learning data to which a label that is less relevant to the target model is added is included in the data set. There is a possibility that the accuracy of prediction by the machine learning model may be lower than the accuracy that is supposed to be achieved, accordingly.

The present disclosure therefore proposes a technique related to an annotation tool capable of assisting a user to perform an operation for selecting a label to be added as an annotation to target data in a preferable manner.

<Functional Configuration>

A functional configuration of an information processing apparatus 101 according to an exemplary embodiment of the present disclosure will be described with reference to FIG. 1. The information processing apparatus 101 presents various types of information to a user through an output unit 113, and recognizes various instructions from the user based on an operation received by an input unit 114 from the user.

The input unit 114 receives an operation from the user, and transmits control information depending on the received operation to the information processing apparatus 101. The input unit 114 is implemented by various input devices, such as a keyboard, a mouse, a trackball, and a pen tablet, which are capable of receiving various operations related to an annotation operation.

The output unit 113 presents various types of information to the user based on a control operation input from the information processing apparatus 101. As a specific example, the output unit 113 may present information about, for example, target data to be annotated, and candidates for a label to be added as an annotation to the target data, to the user. The output unit 113 may provide a user interface (UI) for receiving an instruction from the user based on a control operation from the information processing apparatus 101. The output unit 113 is implemented by an output device, such as a so-called display.

Components of the information processing apparatus 101 will now be described. The information processing apparatus 101 includes a trained model database (DB) 103, a trained model reading unit 102, a label estimation unit 104, a label placement control unit 105, an output control unit 106, a target data DB 108, and a target data reading unit 107. The information processing apparatus 101 further includes an input reception unit 109, an annotation adding unit 110, a previously-annotated data DB 112, and a previously-annotated data storage unit 111.

The trained model DB 103 is a storage area for storing data on a trained model that can be used by the information processing apparatus 101.

In the present exemplary embodiment, the trained model DB 103 is implemented by a database. However, the configuration of the trained model DB 103 is not limited as long as data on the trained model that can be used by the information processing apparatus 101 can be stored in the trained model DB 103. Specific examples of the trained model DB 103 may include a storage device, such as a hard disk drive (HDD) and a solid state drive (SSD). In this case, for example, data on the trained model may be stored in a format that can be referred to from a file system of an operating system (OS) in a storage device, such as an HDD and an SSD.

Conditions for the above-described devices are similar to those for the target data DB 108 and the previously-annotated data DB 112 described below.

The trained model reading unit 102 performs processing for reading data on the trained model stored in the trained model DB 103. As a specific example, the data on the trained model read by the trained model reading unit 102 is loaded into a predetermined storage area (e.g., a random access memory (RAM) 213 or an auxiliary storage device 214 illustrated in FIG. 2) of the information processing apparatus 101. Thus, each component (e.g., the label estimation unit 104 described below) of the information processing apparatus 101 can execute various processing for, for example, estimation, identification, and prediction, using the trained model. The data on the trained model is loaded in the above-described storage area.

The target data DB 108 is a storage area for storing data to be annotated (target data).

FIG. 1 illustrates the trained model DB 103, the target data DB 108, and the previously-annotated data DB 112 as individual components. However, at least two of the components may be implemented by a single device.

Referring to FIG. 1, the information processing apparatus 101 includes the trained model DB 103, the target data DB 108, and the previously-annotated data DB 112. However, at least some of these components may be provided outside the information processing apparatus 101. In this case, the information processing apparatus 101 may access an external apparatus via a network, to thereby obtain data stored in the above-described components (e.g., the target data DB 108) included in the information processing apparatus 101 and load the obtained data into a predetermined storage area.

The target data reading unit 107 performs processing for reading target data to be annotated from the target data DB 108. The target data reading unit 107 outputs the read target data to the label estimation unit 104 and the output control unit 106. In the present exemplary embodiment, to facilitate the explanation, assume that the target data reading unit 107 reads a single piece of target data at a time and outputs the read target data to each of the label estimation unit 104 and the output control unit 106. However, the processing performed by the target data reading unit 107 is not limited thereto. For example, the target data reading unit 107 may read a plurality of pieces of target data at a time and may output the plurality of pieces of target data to each of the label estimation unit 104 and the output control unit 106.

The data read from the target data DB 108 by the target data reading unit 107, i.e., target data to be annotated, corresponds to an example of "second data".

The label estimation unit 104 estimates candidates for a label to be added as an annotation to target data read from the target data reading unit 107 based on the target data and the trained model read from the trained model reading unit 102.

Specifically, the label estimation unit 104 inputs the target data to the trained model, to thereby extract an area to be annotated from the target data and obtain candidates for a label to be added as an annotation for each area and a score for each candidate. In this case, the label estimation unit 104 may obtain not only a candidate with a highest score, but also a plurality of candidates (at least candidates with the top two scores) and a score for each of the plurality of candidates.

A score for each candidate for a label is information depending on a certainty for prediction, estimation, identification, or recognition that information included in the area to be annotated corresponds to information indicated by the label based on the above-described trained model. In other words, the above-described score is an index indicating a likelihood that information included in an area to be annotated corresponds to information indicated by the label. In the present exemplary embodiment, assume that a probability (certainty) for prediction (recognition) that a target (object) indicated in the area to be annotated corresponds to a target (object) indicated by a label based on the above-described trained model is used as a score for each candidate for the label. The index used as the above-described score is not limited to the above-described probability, but instead other indices may be used.

As described above, the label estimation unit 104 extracts candidates for a label to be added as an annotation for each area to be annotated in target data, and estimates a score for each of the extracted candidates. The label estimation unit 104 then outputs, to the label placement control unit 105, a series of label candidates extracted for each area to be annotated and an estimation result of a score for each of the series of label candidates.

The label placement control unit 105 obtains, from the label estimation unit 104, the series of label candidates extracted for each area to be annotated and the estimation result of the score for each of the series of label candidates. The label placement control unit 105 controls processing for displaying display information associated with each of the series of label candidates through the output unit 113 depending on the estimation result of the score for each of the series of extracted label candidates for each area to be annotated.

As a specific example, the label placement control unit 105 may control the placement for display of display information associated with at least each of a first candidate and a second candidate depending on a comparison result between the scores for the first candidate and the second candidate among the series of label candidates. The display information associated with the first candidate corresponds to an example of "first display information", and the display information associated with the second candidate corresponds to an example of "second display information".

In this case, the label placement control unit 105 may control the placement for display of the candidates in view of difficulty in annotation for target data depending on scores for at least some of the series of label candidates.

An example of processing control for displaying the display information through the output unit 113 associated with each of the series of label candidates by the label placement control unit 105 will be described in detail below as an exemplary embodiment.

In the present disclosure, the "display information" corresponds to information to be presented to the user by displaying the information on an output device, such as a display. Examples of the display information include an icon, text information, and an image. In other words, the type of the display information associated with each candidate is not limited as long as each of the series of label candidates can be presented to the user through the output unit 113.

In the following description, a description "displaying display information associated with each candidate" may be expressed as "displaying each candidate", for ease of explanation. In other words, in the following description, the description "displaying each candidate" means "displaying display information associated with each candidate", unless otherwise noted. This holds true for other similar expressions. For example, if a phrase "each candidate is placed" is used to explain a display of information on a screen, the phrase means that "display information associated with each candidate is placed", unless otherwise noted.

The label placement control unit 105 includes a word distributed representation calculation member 115 and a word similarity calculation member 116.

The word distributed representation calculation member 115 calculates a word distributed representation for each label candidate. The word distributed representation is a technique for representing a word as a high-dimensional real number vector. For example, words with similar meanings are associated with close vectors. To calculate the word distributed representation, a neural network, such as "Word2Vec", is used for performing text processing.

The word similarity calculation member 116 calculates a linguistic similarity (hereinafter also referred to as "word similarity") between the series of label candidates based on the word distributed representation calculated for each of the series of label candidates.

The word similarity between the series of label candidates calculated as described above is used for, for example, processing control for displaying of each of the series of label candidates obtained by the label placement control unit 105.

The output control unit 106 generates a screen on which display information associated with each candidate is presented based on the target data read by the target data reading unit 107 and the control result for display of each of the series of label candidates obtained by the label placement control unit 105. The output control unit 106 then causes the output unit 113 to display the generated screen.

The output control unit 106 reflects the result of adding the annotation by the user on the generated screen based on an instruction from the annotation adding unit 110 described below.

An example of the above-described screen generated by the output control unit 106 will be described in detail below as an exemplary embodiment.

The input reception unit 109 obtains, from the input unit 114, control information based on an operation received from the user by the input unit 114, and transmits the obtained control information to the annotation adding unit 110.

The annotation adding unit 110 obtains the control information based on an input from the user through the input reception unit 109, and executes processing for adding a label as an annotation to target data based on the control information. The processing for adding a label as an annotation to target data by the annotation adding unit 110 may vary from task to task depending on the type of the target data.

As a specific example, in a case of a task of detecting an object captured in an image, the annotation adding unit 110 executes processing for identifying the position in the image of the object captured in the image (target data) to be annotated and for adding a label indicating the object.

As another example, in a case of a task for classifying documents based on natural language processing, the annotation adding unit 110 executes processing for adding a label indicating a category of a document (target data) to be annotated on the document.

As described above, the contents of processing for adding a label to target data performed by the annotation adding unit 110 may appropriately be changed depending on, for example, the type of the target data to be annotated, and the purpose of adding a label as an annotation.

The previously-annotated data storage unit 111 associates the target data with information about the label added as the annotation to the target data by the annotation adding unit 110, and stores the target data and the information in the previously-annotated data DB 112. The previously-annotated target data stored in the previously-annotated data DB 112 may be stored, for example, in a data format usable for training data in supervised learning. The previously-annotated target data (e.g., training data) stored in the previously-annotated data DB 112 corresponds to an example of "first data".

<Hardware Configuration>

Figure 2:
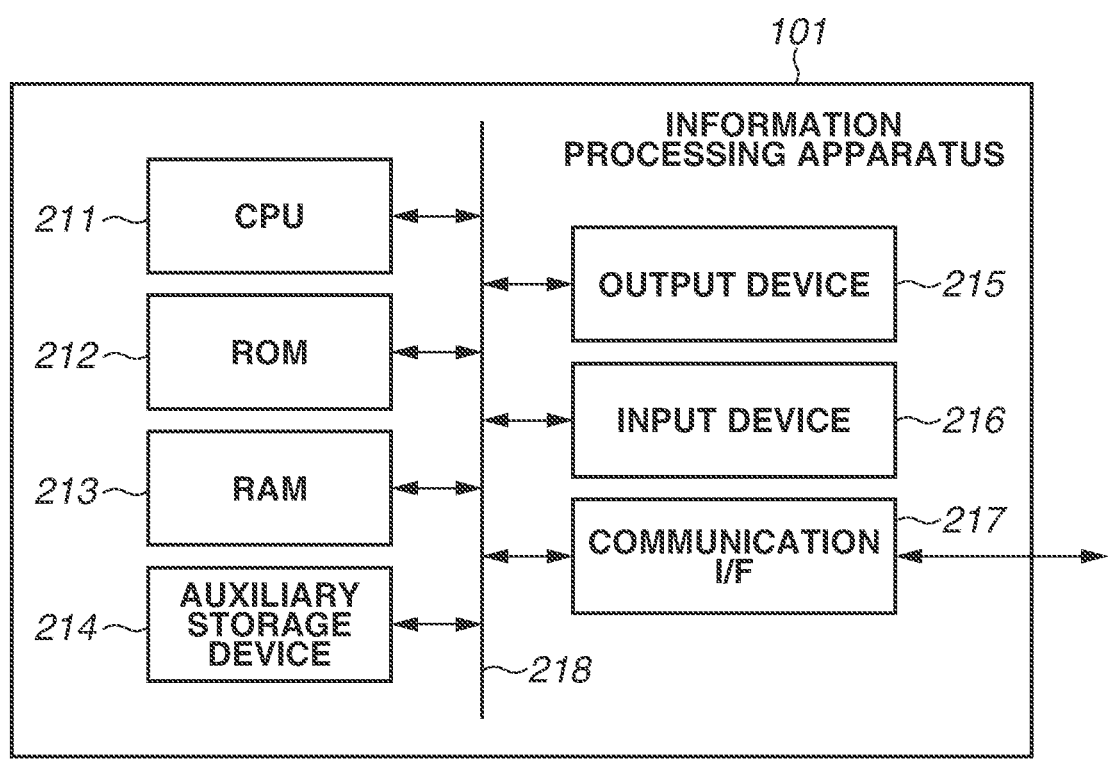
FIG. 2 is a block diagram illustrating a hardware configuration of the information processing apparatus.

An example of a hardware configuration of the information processing apparatus 101 according to the present exemplary embodiment will be described with reference to FIG. 2. As illustrated in FIG. 2, the information processing apparatus 101 according to the present exemplary embodiment includes a central processing unit (CPU) 211, a read-only memory (ROM) 212, and the RAM 213. The information processing apparatus 101 further includes the auxiliary storage device 214, an output device 215, an input device 216, and a communication interface (I/F) 217. The CPU 211, the ROM 212, the RAM 213, the auxiliary storage device 214, the output device 215, the input device 216, and the communication I/F 217 are connected to each other via a bus 218.

The CPU 211 is a central processing unit that controls various operations to be executed by the information processing apparatus 101. For example, the CPU 211 may control the entire operation of the information processing apparatus 101. The ROM 212 stores, for example, control programs, and boot programs that can be executed by the CPU 211. The RAM 213 is a main storage memory for the CPU 211. The RAM 213 is used as a work area or a temporary storage area for loading various programs.

The auxiliary storage device 214 stores various data and various programs. The auxiliary storage device 214 is implemented by a storage device capable of temporarily or permanently storing various data. Examples of the storage device include a nonvolatile memory as typified by an HDD and an SSD.

The output device 215 is a device that outputs various types of information. The output device 215 presents various types of information to the user. In the present exemplary embodiment, the output device 215 is implemented by a display device, such as a display. The output device 215 displays various display information, thereby presenting the information to the user. As another example, the output device 215 may be implemented by an acoustic output device that outputs sound, such as voice or electronic sound. In this case, the output device 215 outputs sound, such as voice or telegraph, to thereby present information to the user. The device applied as the output device 215 may appropriately be changed depending on a medium used for presenting information to the user. The output unit 113 illustrated in FIG. 1 can be implemented by, for example, the output device 215.

The input device 216 receives various instructions from the user. In the present exemplary embodiment, examples of the input device 216 include an input device, such as a mouse, a keyboard, and a touch panel. Other examples of the input device 216 may include a sound collecting device, such as a microphone, to collect voice uttered by the user. In this case, various types of analysis processing, such as acoustic analysis processing and natural language processing, are executed on the collected voice, thereby recognizing the contents indicated by the voice as an instruction from the user. The device applied as the input device 216 may appropriately be changed depending on a method for recognizing an instruction from the user. Various types of devices may also be applied as the input device 216. The input unit 114 illustrated in FIG. 1 can be implemented by, for example, the input device 216.

The communication I/F 217 communicates with an external apparatus via a network. The device applied as the communication I/F 217 may appropriately be changed depending on the type of a communication path or a communication method to be applied.

Figure 3:
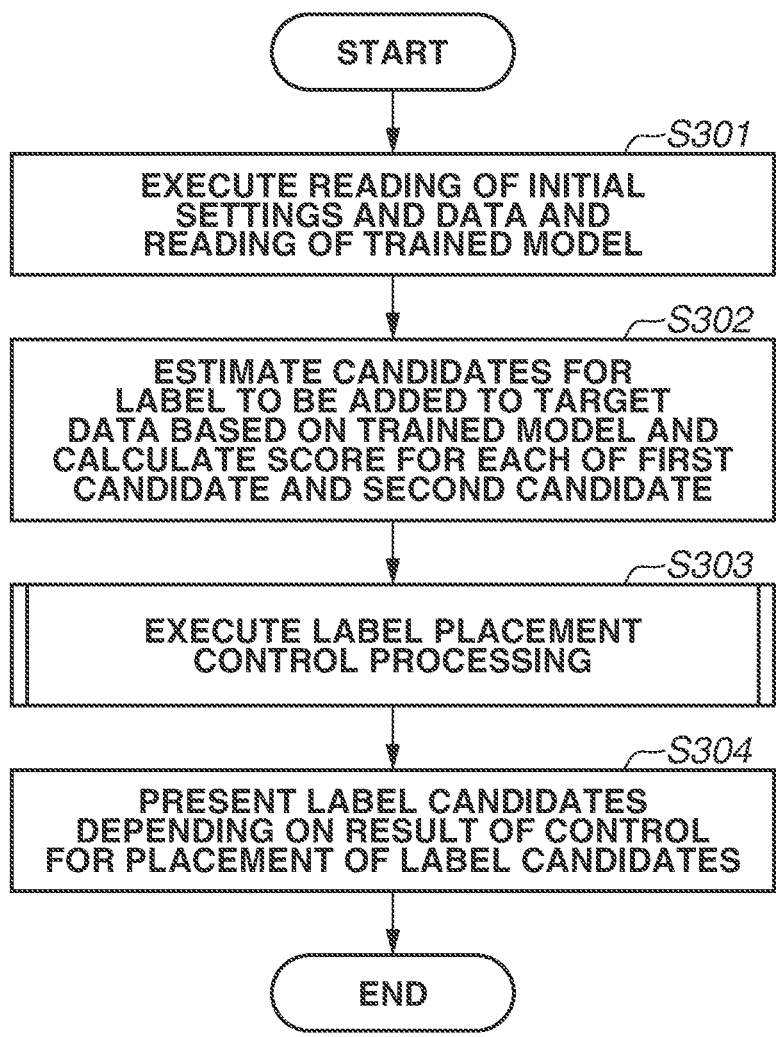
FIG. 3 is a flowchart illustrating an example of processing to be performed by the information processing apparatus.
Figure 4:
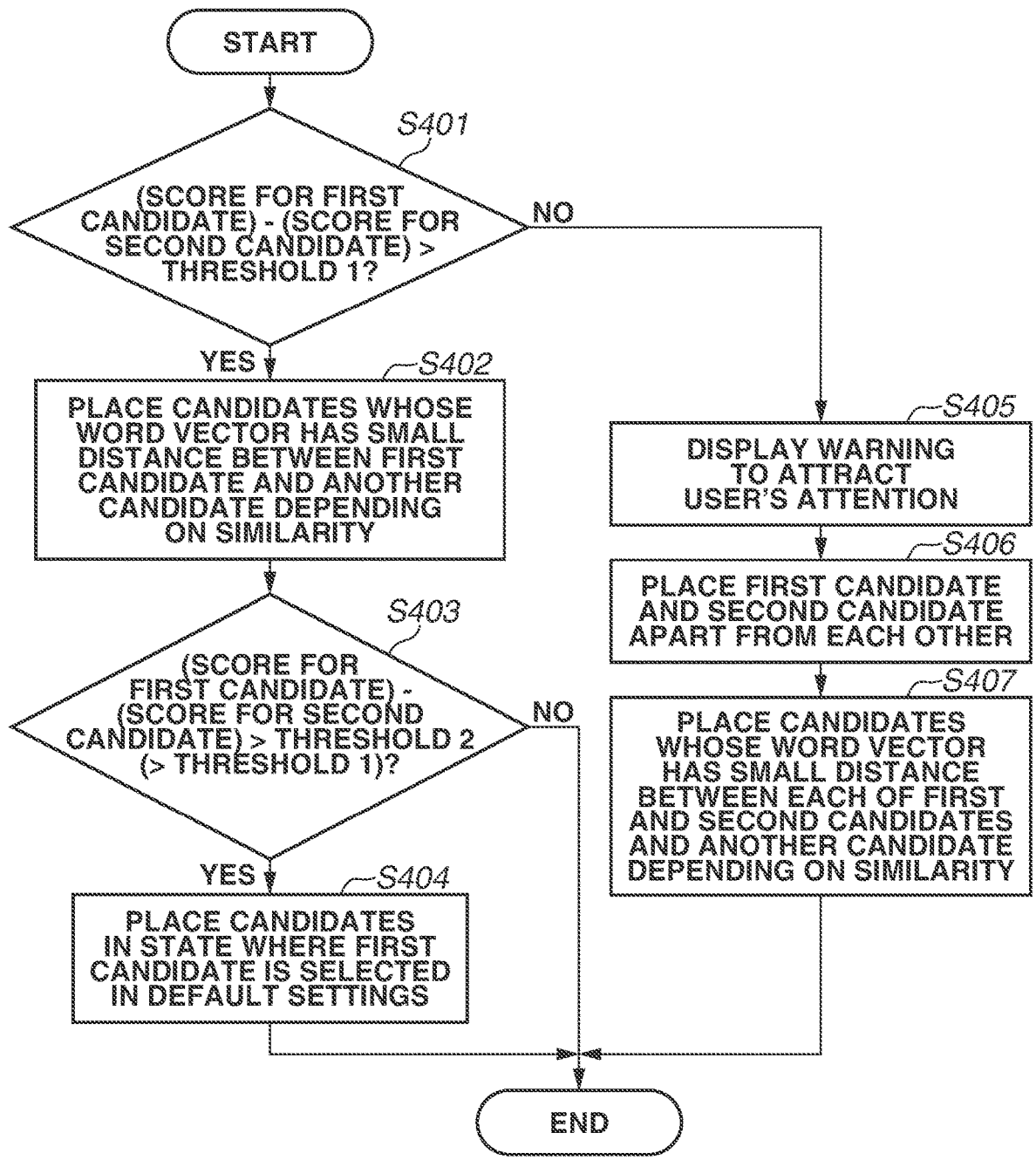
FIG. 4 is a flowchart illustrating an example of processing to be performed by the information processing apparatus.

The CPU 211 loads programs stored in the ROM 212 or the auxiliary storage device 214 into the RAM 213 and executes the programs, thereby implementing the functional configuration of the information processing apparatus 101 illustrated in FIG. 1 and processing of flowcharts illustrated in FIGS. 3 and 4.

<Processing>

An example of processing to be performed by the information processing apparatus 101 according to the present exemplary embodiment will be described with reference to FIGS. 3 and 4.

An entire processing flow to be executed by the information processing apparatus 101 will now be described with reference to FIG. 3.

In step S301, the information processing apparatus 101 executes reading of initial settings for each function, target data to be annotated. The information processing apparatus 101 also reads a trained model used for controlling display of candidates for a label to be added as an annotation to the target data. The information processing apparatus 101 may execute the processing of step S301 at least once, for example, when the annotation operation is started, and may use various set parameters and various read data in the subsequent processing.

In step S302, the information processing apparatus 101 estimates candidates for a label to be added as an annotation to the read target data by using the read learning model. At this time, the information processing apparatus 101 obtains a score for each of a series of candidates including at least the first candidate and the second candidate for each area to be annotated (e.g., an object captured as a subject in an image).

In the example illustrated in FIGS. 3 and 4, for convenience of explanation, assume that a candidate with a highest score corresponds to the first candidate and a candidate with the second highest score corresponds to the second candidate.

The above-described processing is, however, merely an example and is not intended to limit the processing to be performed by the information processing apparatus 101 according to the present exemplary embodiment. For example, the information processing apparatus 101 may manage information about each of the first candidate and the second candidate and information about the other candidates separately. The information processing apparatus 101 may also manage information about the first candidate and information about the other candidates separately. In other words, the method for managing information about each candidate is not limited as long as the information processing apparatus 101 can recognize that the trained model predicts the first candidate with a certain degree of certainty based on a relationship between the score for the first candidate and the score for another candidate.

The processing performed in step S302 corresponds to an example of processing for obtaining an estimation result of a score representing a likelihood for each of the first candidate and the second candidate for a label to be added as an annotation to target data.

In step S303, the information processing apparatus 101 controls processing for displaying each of the series of label candidates based on the estimation result of the score for each of the series of extracted label candidates for each area to be annotated. In the example illustrated in FIGS. 3 and 4, assume that the information processing apparatus 101 controls the placement for display of each of the series of label candidates, for convenience of explanation. The processing of step S303 will be described in detail below with reference to FIG. 4.

The processing of step S303 corresponds to an example of processing for controlling processing for displaying first display information associated with the first candidate and second display information associated with the second candidate through the output unit 113 depending on the score for each of the first candidate and the second candidate.

In step S304, the information processing apparatus 101 generates a screen on which the display information corresponding to each candidate is presented based on the result of controlling the placement for display of each of the series of label candidates, and causes the output unit 113 to display the screen.

The processing performed in step S303 illustrated in FIG. 3 will now be described in detail with reference to FIG. 4. A series of processes illustrated in FIG. 4 is defined based on an idea that, if target data cannot be easily predicted with high accuracy by the trained model, it may also be difficult for the user to identify candidates for a label to be added as an annotation.

In other words, as for target data that cannot be easily determined by the user, the user may select suitable candidates by checking in detail the candidates for a label to be added as an annotation. In such a case, it is important in terms of maintaining the quality of a data set to create a situation where the user can select candidates for a label to be added as an annotation by accurately discriminating the first candidate and the second candidate estimated by the trained model.

In view of the above-described circumstances, the information processing apparatus 101 according to the present exemplary embodiment controls the placement for display of each candidate so as to prevent an occurrence of a situation where a candidate different from a candidate intended by the user is selected. As a specific example, the information processing apparatus 101 controls candidates to be placed apart from each other depending on the difference between the score for the first candidate and the score for the second candidate. Consequently, it is possible to prevent the occurrence of a situation where the user selects the second display information associated with the second candidate under a situation where the user intends to select the first display information associated with the first candidate.

In view of the foregoing, the processing of step S303 illustrated in FIG. 3 will be described in detail below.

In step S401, the information processing apparatus 101 calculates the difference between the score for the first candidate and the score for the second candidate, and determines whether the difference exceeds a threshold 1. The threshold 1 used in the determination for the processing performed in step S401 corresponds to an example of a "first threshold".

If the information processing apparatus 101 determines that the difference between the score for the first candidate and the score for the second candidate exceeds the threshold 1 (YES in step S401), the processing proceeds to step S402. In step S402, the information processing apparatus 101 calculates a linguistic similarity between the first candidate and another candidate. The other candidate includes the second candidate.

Examples of a method for calculating the linguistic similarity between candidates include a method in which when each candidate is represented by a vector based on linguistic features (the vector is hereinafter also referred to as a "word vector"), a distance between word vectors corresponding to a series of candidates is calculated. As a method for converting each candidate for a label into a word vector, a word distributed representation technique, such as "Word2Vec", can be used. As a method for calculating a distance between word vectors, for example, a technique using a cosine similarity between vectors can be used.

The above-described methods are merely examples, and the methods are not limited as long as a linguistic similarity among a plurality of candidates can be calculated. As a specific example, information about a similarity relation between words may be collected to construct a dictionary (e.g., a thesaurus) in which words with a high linguistic similarity are associated. Similarities between candidates may be identified using the dictionary.

The information processing apparatus 101 controls the placement for display of candidates such that a candidate with a higher similarity to the first candidate is placed at a position closer to the first candidate.

For example, the information processing apparatus 101 may control the placement on the screen for display of a series of candidates based on a result of calculation of a distance between word vectors for the series of candidates. If the linguistic similarity between the first candidate and the second candidate is high, the second candidate can be placed next to the first candidate. It may be acceptable to select the first candidate that has been determined by the trained model to have a highest degree of certainty. However, if it is more appropriate to select the second candidate, the presence of the second candidate can be easily noticed and thus a more appropriate label can be selected. Since the linguistic similarity between the first candidate and the second candidate is high, the degradation in the accuracy of label selection has little influence on the accuracy of learning data, even in a case where the label selection accuracy is low due to an insufficiency of user's knowledge or ability to identify objects.

As a specific example, the information processing apparatus 101 may place the first candidate at a leftmost placement position among prescribed placement positions, and may place display information about each candidate at the other placement positions in ascending order of distances between word vectors from the left side to the first candidate. In this case, the information processing apparatus 101 may place the first candidate at another placement position (e.g., a rightmost position), instead of placing the first candidate at the leftmost position. The information processing apparatus 101 may also randomly change the placement position from time to time.

As another example, the information processing apparatus 101 may control display information associated with each candidate to be displayed in a dropdown list. In this case, the information processing apparatus 101 may associate the sequence of display information to be displayed in a list with the distance between candidates, thereby presenting a list of display information associated with each candidate.

In step S403, the information processing apparatus 101 determines whether the difference between the score for the first candidate and the score for the second candidate exceeds a threshold 2. It is assumed that the threshold 2 is a value greater than the threshold 1 used for the determination in step S401. In other words, a case where the difference between the score for the first candidate and the score for the second candidate exceeds the threshold 2 corresponds to a case where the certainty that the estimation result by the trained model indicates the first candidate is extremely higher than that for the other candidates. The threshold 2 used for the determination in the processing of step S403 corresponds to an example of a "second threshold".

The threshold 1 and the threshold 2 may be preliminarily set by, for example, the user (e.g., administrator). As another example, the information processing apparatus 101 may update at least one of the threshold 1 and the threshold 2 depending on a history of scores output from the trained model. In this case, the information processing apparatus 101 may execute the above-described update processing at a predetermined timing in a series of annotation operations, at a timing before the series of annotation operations are started, or at a timing after the series of annotation operations are finished.

If the information processing apparatus 101 determines that the difference between the score for the first candidate and the score for the second candidate exceeds the threshold 2 (YES in step S403), the processing proceeds to step S404. In this case, the score for the first candidate output from the trained model is extremely higher than that for the other candidates, and thus it is extremely likely that the user may select the first candidate. In step S404, the information processing apparatus 101 controls display of each candidate in a state where the first candidate is selected in default settings, accordingly.

The application of control processing described above makes it possible to save the user time and labor to select candidates and to reduce the possibility of occurrence of a situation where another candidate is accidentally selected. Consequently, the user's operation can be effectively performed and the degradation in the quality of a data set can be prevented.

Upon completion of the processing of step S404, the information processing apparatus 101 terminates the series of processes illustrated in FIG. 4.

In contrast, if the information processing apparatus 101 determines that the difference between the score for the first candidate and the score for the second candidate does not exceed the threshold 2 (NO in step S403), the series of processes illustrated in FIG. 4 is terminated.

If the information processing apparatus 101 determines that the difference between the score for the first candidate and the score for the second candidate does not exceed the threshold 1 (NO in step S401), the processing proceeds to step S405. In this case, the scores for the first candidate and the second candidate output from the trained model are small values, and thus a situation is assumed in which a candidate that is not intended by the user is accidentally selected. In step S405, the information processing apparatus 101 may thus display predetermined notification information (e.g., information indicating a warning) on the screen to attract a user's attention.

In this case, the information processing apparatus 101 may display an icon or message indicating a warning as notification information, or may control a display mode for the notification information, for example, by blinking the notification information. The information notification method is not limited as long as it is possible to attract a user's attention. As a specific example, the information processing apparatus 101 may notify the user of information using sound or vibration as a medium.

In step S406, the information processing apparatus 101 controls the placement for display of each candidate such that the first candidate and the second candidate are placed apart from each other on the screen. In a situation where the certainty of prediction by the trained model is low as in a situation where the processing of step S406 is executed, it may be desirable to prevent the occurrence of a situation where a candidate different from a candidate intended by the user is accidentally selected. In this case, as described above, the first candidate and the second candidate are placed apart from each other, thereby making it possible to prevent the occurrence of a situation where a candidate that is not intended by the user is accidentally selected.

In step S405, even when the first candidate and the second candidate are placed apart from each other by notifying the user of notification information to attract a user's attention, the occurrence of a situation where the user overlooks one of the first and second candidates can be prevented.

As described above, the situation where the processing of step S406 is executed corresponds to the situation where the certainty of prediction by the trained model is low. If a machine learning model is constructed based on data obtained as a product of an annotation operation, it may be desirable to construct a machine learning model capable of accurately distinguishing the first candidate from the second candidate for an annotation target. In order to construct the machine learning model capable of accurately distinguishing the first candidate from the second candidate as described above, it may thus be desirable to prevent the occurrence of a situation where one of the first candidate and the second candidate that is not intended by the user is accidentally selected. As described above in the processing of step S406, the first candidate and the second candidate are placed apart from each other, thereby making it possible to suppress the degradation in the quality of a data set due to erroneous labeling caused by a mistake in operation by the user.

In step S407, the information processing apparatus 101 determines other candidates to be placed in the vicinity of each of the first candidate and the second candidate. The processing of step S407 is executed so as to reduce adverse effects of degradation in the quality of a data set even in a case where a candidate different from a candidate intended by the user is accidentally selected when the user intends to select one of the first candidate and the second candidate.

Specifically, the information processing apparatus 101 controls candidates such that a candidate having a high linguistic similarity to the first candidate and a candidate having a high linguistic similarity to the second candidate are placed in the vicinity of the first candidate and the vicinity of the second candidate, respectively. In this case as in the processing performed in step S402, the information processing apparatus 101 can identify a candidate that has a small distance between a word vector for the candidate and the word vector for the first candidate, and a candidate that has a small distance between a word vector for the candidate and the word vector for the second candidate, based on the scores for the candidates output from the trained model. Thus, the information processing apparatus 101 can control the candidates such that the smaller the distance between a word vector for a candidate and the word vector for the first candidate is, the closer the candidate is placed to the first candidate. The information processing apparatus 101 can also control the candidates such that the smaller the distance between a word vector for a candidate and the word vector for the second candidate is, the closer the candidate is placed to the second candidate.

The processing of step S303 illustrated in FIG. 3 has been described in detail above with reference to FIG. 4. The above-described processing is merely an example and the processing to be executed by the information processing apparatus 101 is not limited as long as the display of display information (e.g., placement of display information) corresponding to each candidate can be controlled depending on the difference between the score for the first candidate or the score for the second candidate. As a specific example, how to improve the quality of a data set or a tendency for an operator to make mistakes may vary depending on a task for the annotation operation or a learning level of the operator. In such a case, at least some of the conditions for controlling the display of each candidate as described above may be changed appropriately.

Exemplary Embodiments

The above-described hardware configuration and functional configuration of the information processing apparatus 101 are common to the following exemplary embodiments. As an exemplary embodiment of the information processing apparatus 101 according to the present exemplary embodiment, an example of a UI will be described. The UI is used for the information processing apparatus 101 to implement processing for presenting, to the user, candidates for a label to be added as an annotation to target data and processing for receiving a designation of each candidate for the label from the user.

An example of the UI according to a first exemplary embodiment will be described with reference to FIG. 5. A screen 501 is an example of a screen to be presented to the user through the output unit 113 by the information processing apparatus 101. The screen 501 presents target data to be annotated to the user, and receives various instructions for the annotation operation on the target data from the user.

The present exemplary embodiment illustrates an example of the screen to be presented to the user, assuming a case where an image annotation operation is performed to create correct answer data in an object recognition task. Specifically, in the annotation task according to the present exemplary embodiment, it is assumed that the user selects an object captured as a subject in an image by designating an area using a rectangle or the like, and adds a correct answer label indicating the object.

An area 502 is an area in which the target data to be annotated is displayed. In the example illustrated in FIG. 5, an image is displayed as the target data in the area 502. The area 502 receives, from the user, a designation of an area to be annotated in the displayed target data (e.g., image).

Areas 503, 504, and 505 are areas to be annotated in the target data displayed in the area 502. Specifically, in the example illustrated in FIG. 5, the areas 503, 504, and 505 are areas corresponding to objects each captured as a subject in the image displayed in the area 502.

In the following description, for convenience of explanation, assume that each of the objects corresponding to the areas 503 and 504 represents a "standard-sized car" and the object corresponding to the area 505 represents a "truck". The information processing apparatus 101 recognizes what a subject captured in the image indicates based on the correct answer label as an annotation added by the user. The information processing apparatus 101 may recognize each object captured as a subject in the image by using the trained model constructed for object recognition. In this case, the information processing apparatus 101 can obtain, as outputs from the trained model, an object name of the object and a score (probability) representing a likelihood of the object name.

Areas 506, 507, and 508 are areas that receive, from the user, a designation of a label to be added as an annotation to the objects displayed in the areas 503, 504, and 505, respectively. The information processing apparatus 101 presents candidates for a label to be added as an annotation to the areas 506, 507, and 508 based on the estimation result of the objects corresponding to the areas 503, 504, and 505, respectively, using the trained model. In this case, the information processing apparatus 101 may dynamically control the placement of a series of label candidates presented in the areas 506, 507, and 508 and a state of a UI for presenting the candidates, based on the estimation result of target objects using the trained model.

A specific example of processing in which the information processing apparatus 101 controls the placement of a series of label candidates and a state of a UI for presenting the candidates, for each of the areas 506, 507, and 508 will be described below.

An example of processing for controlling the placement of a series of label candidates and the state of the UI for presenting the candidates in the area 506 will now be described.

The area 506 is an area in which candidates for a label to be added as an annotation to the object displayed in the area 503 are presented. The information processing apparatus 101 estimates the object as a first candidate indicating a "standard-sized car" with a probability of 70% and a second candidate indicating a "building" with a probability of 10%. These are candidates for a label indicating the object displayed in the area 503.

In the present exemplary embodiment, a probability indicating a likelihood of an object indicated by each candidate is used as a score for each of the first candidate and the second candidate for the label output from the trained model. The threshold 1 described above with reference to FIG. 4 is set to 50%. The threshold 2 described above with reference to FIG. 4 is set to 80%.

The information processing apparatus 101 calculates the difference between the score for the first candidate and the score for the second candidate. In an example of candidates presented in the area 506, the difference corresponds to the difference between 70% and 10%, i.e., 60%. This difference can be considered to be an index indicating a degree of certainty at which the trained mode estimates the first candidate. This is because a large difference between the score for the first candidate and the score for the second candidate indicates that the first candidate has a much higher score than the score of the second candidate and the second candidate has a much lower score than the score of the first candidate.

Since the difference 60% in probability described above exceeds the threshold 1 (50%), the information processing apparatus 101 determines "YES" in the conditional determination in step S401 illustrated in FIG. 4.

In the processing of step S402, the information processing apparatus 101 identifies another candidate whose word vector has a small distance between the first candidate "standard-sized car" and the other candidate. The information processing apparatus 101 controls the candidate such that the smaller the distance between the word vector for the first candidate and the word vector for the other candidate, the closer the candidate is placed to the first candidate in the area 506.

It is also possible that there is no vocabulary for the word vector corresponding to the word "standard-sized car". In such a case, the information processing apparatus 101 may use, for example, a word division library to divide the word "standard-sized car" into words "standard-sized" and "car", and may apply an average of word vectors for a plurality of divided words as the word vector for the word "standard-sized car".

As another example, the information processing apparatus 101 may apply the word vector for any one of a plurality of divided words as the word vector for the word to be divided. Specifically, in this case, the information processing apparatus 101 may divide the word "standard-sized car" into words "standard-sized" and "car" and may apply the word vector for one of the words "standard-sized" and "car" as the word vector for the word "standard-sized car".

The application of the technique as described above makes it possible to set candidates for a target label as a control target of processing for displaying the candidates as illustrated in FIG. 4 even under a situation where the candidates are not set as vocabulary for word vectors.

As described above in the processing of step S402 illustrated in FIG. 4, for example, a cosine similarity can be used as a distance between word vectors for candidates for a label.

The information processing apparatus 101 extracts candidates with the top four probabilities (scores), e.g., "standard-sized car", "building", "truck", and "house", as an estimation result of candidates for a label to be added to the object displayed in the area 503.

If the above-described series of candidates are placed in descending order of probability from the left side, the "building" having the second highest probability is placed next to the "standard-sized car" having the highest probability. When the candidates are placed as described above, there is a possibility that the word "building", the meaning of which is much different from the meaning of the word "standard-sized car", may be selected due to a mistake in user's operation under a status where the user intends to select the "standard-sized car". Thus, if a candidate having a different meaning is selected, learning data to which a label indicating a meaning that is much different from the meaning of the word indicated by a label that is supposed to be added is generated, which may lead to a considerable degradation in the quality of a data set used to construct a machine learning model.

In view of the above-described circumstances, to reduce adverse effects of degradation in the quality of a data set caused by a mistake in selection by the user, the placement for display of each candidate is controlled in the processing of step S402 illustrated in FIG. 4. Specifically, the information processing apparatus 101 controls the placement for display of each candidate such that the smaller a distance between a word vector for a candidate and the word vector for the first candidate is, the closer the candidate is placed to the first candidate.

In an example of candidates presented in the area 506, the distance between the word vector for the first candidate "standard-sized car" and the word vector for another candidate decreases in the order of "truck", "house", and "building". In this case, the information processing apparatus 101 places the "truck" at a position adjacent to the first candidate "standard-sized car". Consequently, even if, for example, a candidate adjacent to the "standard-sized car" is accidentally selected under a situation where the user intends to select the "standard-sized car", the "truck", the meaning of which is closer to the "standard-sized car" is selected, thereby making it possible to reduce adverse effects of degradation in the quality of a data set.

In general, a convolution neural network used for image recognition tends to recognize broad features of an image in a deep convolution layer of the network. In the convolution neural network, a convolution filter for recognizing features of "vehicle" may be included. In a case of labeling, if the "truck" is accidentally selected under a situation where the user intends to select the "standard-sized car", the features of "vehicle" can be learned in learning of the convolution neural network, unlike in a case where the "building" is accidentally selected, accordingly. That is, in the case where the "truck" is accidentally selected, adverse effects of degradation in the quality of a data set can be reduced as compared with the case where the "building" is accidentally selected under the situation where the user intends to select the "standard-sized car".

The information processing apparatus 101 compares the difference (60%), which is the difference between the score for the first candidate and the score for the second candidate, with the threshold 2 (80%) in the processing of step S403 illustrated in FIG. 4. In this case, the difference (60%) is less than or equal to the threshold 2 (80%), and thus the information processing apparatus 101 determines "NO" in the conditional determination in step S403.

As described above, the placement of the series of label candidates in the area 506 is controlled.

An example of processing for controlling the placement of a series of label candidates and a state of a UI for presenting the candidates in the area 507 will now be described.

The area 507 is an area in which candidates for a label to be added as an annotation to the object displayed in the area 504 are presented. The information processing apparatus 101 estimates the object as a first candidate indicating a "standard-sized car" with a probability of 95% and a second candidate indicating a "building" with a probability of 2%. These are candidates for a label indicating the object displayed in the area 504.

Like in the example described above in regard to the area 506, the threshold 1 is set to 50%, and the threshold 2 is set to 80%.

The information processing apparatus 101 calculates the difference between the score for the first candidate and the score for the second candidate. In an example of candidates presented in the area 507, the difference corresponds to the difference between 95% and 2%, i.e., 93%.

Since the difference 93% in probability exceeds the threshold 1 (50%), the information processing apparatus 101 determines "YES" in the conditional determination in step S401 illustrated in FIG. 4.

In the processing of step S402, the information processing apparatus 101 identifies another candidate whose word vector has a small distance between the first candidate "standard-sized car" and the other candidate. The information processing apparatus 101 controls the candidate such that the smaller the distance between the word vector for the first candidate and the word vector for the other candidate is, the closer position to the first candidate the candidate is placed at in the area 506.

The information processing apparatus 101 extracts the top four probabilities (scores), e.g., "standard-sized car", "building", "truck", and "house", as an estimation result of candidates for the label to be added to the object displayed in the area 504. The distance between the word vector for the first candidate "standard-sized car" and the word vector for another candidate decreases in the order of "truck", "house", and "building".

The information processing apparatus 101 compares the difference (93%), which is the difference between the score for the first candidate and the score for the second candidate, with the threshold 2 (80%) in the processing of step S403 illustrated in FIG. 4. In this case, the difference (93%) exceeds the threshold 2 (80%), and thus the information processing apparatus 101 determines "YES" in the conditional determination in step S403.

In the case where the result of the conditional determination in step S403 indicates "YES", it can be considered that the trained model estimates the first candidate with a high degree of certainty. In such a case, it is highly likely that the user may select the first candidate with a high degree of certainty, even when the user performs labeling processing. The information processing apparatus 101 therefore controls the display of each candidate such that the candidates are displayed in a state where the first candidate is selected in default settings in the processing of step S404 illustrated in FIG. 4.

The application of control processing described above makes it possible to save the user time and labor for selecting candidates, except for a case where candidates other than the first candidate are selected again. The application of control processing also makes it possible to reduce the possibility of occurrence of a situation where another candidate different from a candidate intended by the user is accidentally selected. The user's operation can be effectively performed and the degradation in the quality of a data set can be prevented in a more preferred mode, accordingly.

An example of processing for controlling placement of a series of label candidates and a state of a UI for presenting the candidates in the area 508 will now be described.

The area 508 is an area in which candidates for a label to be added as an annotation to the object displayed in the area 505 are presented. The information processing apparatus 101 estimates the object as a first candidate indicating a "standard-sized car" with a probability of 40% and a second candidate indicating a "truck" with a probability of 30%. These are candidates for a label indicating the object displayed in the area 505.

Like in the examples described above in regard to the areas 506 and 507, the threshold 1 is set to 50%, and the threshold 2 is set to 80%.

The information processing apparatus 101 calculates the difference between the score for the first candidate and the score for the second candidate. In an example of candidates presented in the area 507, the difference corresponds to the difference between 40% and 30%, i.e., 10%.

Since the difference 10% in probability is less than or equal to the threshold 1 (50%), the information processing apparatus 101 determines "NO" in the conditional determination in step S401 illustrated in FIG. 4.

In the case where the result of the conditional determination in step S401 indicates "NO", the difference between the scores for the first candidate and the second candidate estimated by the trained model is not large, and thus it is estimated that it is difficult for the trained model to perform prediction (e.g., to identify an object) with a high degree of certainty. In such a case, it may be desirable to perform control processing for preventing the occurrence of a situation where a candidate not intended by the user is accidentally selected by the user.

For example, the information processing apparatus 101 may display predetermined notification information (e.g., information indicating a warning) on the screen to call attention to the user, similarly to the processing of step S405 illustrated in FIG. 4. As a specific example, a mark for attracting a user's attention and a message "caution needed" are displayed in the area 508 as notification information in the example illustrated in FIG. 5.

The information processing apparatus 101 controls the placement for display of each candidate such that the first candidate and the second candidate are placed apart from each other on the screen, in the processing of step S406 illustrated in FIG. 4. In the example illustrated in FIG. 5, the first candidate "standard-sized car" and the second candidate "truck" are controlled such that the first candidate and the second candidate are placed to be apart from each other.

Figure 5:
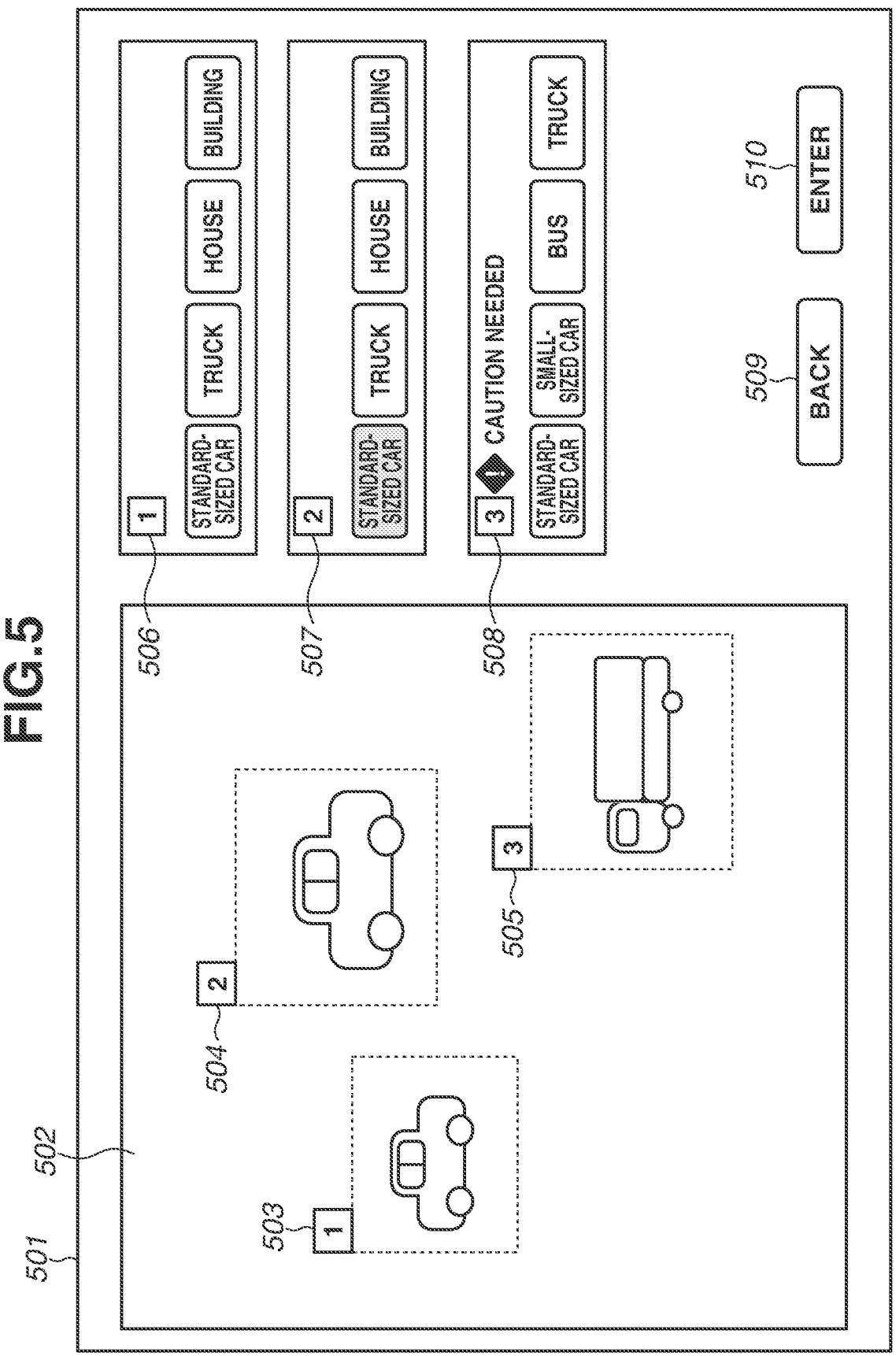
FIG. 5 illustrates an example of a screen to be displayed through an output unit by the information processing apparatus.

In the example illustrated in FIG. 5, up to four label candidates are presented for each object to be annotated. The information processing apparatus 101 places the first candidate "standard-sized car" at the left end of the area 508, and places the second candidate "truck" at the right end of the area 508. The example illustrated in FIG. 5 is merely an example, and the method for placing candidates is not limited as long as the first candidate and the second candidate are placed apart from each other. As a specific example, the first candidate may be placed at the right end of the area 508, and the second candidate may be placed at the left end of the area 508. As another example, the placement of each candidate may be controlled such that other candidates are interposed between the first candidate and the second candidate. As still another example, a space formed between the first candidate and the second candidate may be controlled to be wider than a space formed between the first candidate or the second candidate and another candidate adjacent to the first candidate or the second candidate.

The information processing apparatus 101 controls candidates such that a candidate having a small distance (i.e., a high linguistic similarity) between a word vector for the candidate and the word vector for the first candidate and a candidate having a small distance between a word vector for the candidate and the word vector for the second candidate is placed near the first candidate and the second candidate, respectively. A method for calculating distances between word vectors for a plurality of candidates is similar to that used in the processing of step S402.

The application of control processing as described above makes it possible to reduce adverse effects of degradation in the quality of a data set even in a case where a candidate different from the first candidate and the second candidate is accidentally selected when the user intends to select one of the first candidate and the second candidate, similarly to the case of executing the processing of step S402.

Buttons 509 and 510 will now be described.

The button 509 receives, from the user, an instruction to cancel the annotation operation for the target data displayed in the area 502. When the information processing apparatus 101 detects that the button 509 is pressed, another target data previously set as a target for the annotation operation may be set as an annotation operation target again.

The button 510 receives, from the user, an instruction to enter the annotation operation executed on the target data displayed in the area 502. Upon detecting that the button 510 is pressed, the information processing apparatus 101 associates the target data with information about a label added as an annotation to the target data, and stores the target data and the information in the previously-annotated data DB 112. If another target data that is not set as the target for the annotation operation is present, the information processing apparatus 101 may use the other target data as a new target for the annotation operation.

An example of the screen according to the first exemplary embodiment has been described above with reference to FIG. 5. The present exemplary embodiment proposes an example of a technique for dynamically controlling the placement of each candidate for a label to be added as an annotation to target data based mainly on the following two technical ideas. The first technical idea is that it may be desirable to take measures to prevent the occurrence of a situation where a candidate not intended by the user is accidentally selected when data that cannot be easily predicted by the trained model with a high degree of certainty is to be processed. The second technical idea is that it may be desirable to enable the user to select a candidate with a high degree of certainty when data that can be predicted by the trained model with a high degree of certainty is to be processed, and to prevent adverse effects of a simple mistake in selection by the user.

As described above, the information processing apparatus 101 according to the present exemplary embodiment can assist the user to select candidates for a label in a preferred mode under a situation where the user adds a label as an annotation to target data. Specifically, the application of the above-described configuration and control processing makes it possible to reduce the possibility of occurrence of a situation where a candidate different from a label candidate intended by the user is accidentally selected. Further, even when a candidate not intended by the user is accidentally selected, adverse effects of degradation in the quality of a data set due to erroneous labeling can be reduced. When candidates for a label are estimated by the trained model with a high degree of certainty, the candidates are displayed in a state where the candidates are selected in default settings. The user's operation can thereby be effectively performed and the degradation in the quality of a data set can be prevented.

An example of a UI according to a second exemplary embodiment will now be described. The first exemplary embodiment described above illustrates an example where control processing is performed such that the first candidate and the second candidate are placed apart from each other when data that cannot be easily predicted by the trained model with a high degree of certainty is to be processed. This example is based on an assumption that when data that cannot be easily predicted by the trained model with a high degree of certainty is to be processed, it is also difficult for the user to select candidates with a high degree of certainty, and thus the user may select candidates after checking a series of label candidates.

In contrast, under a situation where the user performs an operation for adding a label as an annotation to a large amount of data in a short period of time, the user may not select candidates after checking a series of label candidates.

In the first exemplary embodiment, if the information processing apparatus 101 determines "NO" in the conditional determination in step S401 illustrated in FIG. 4, the information processing apparatus 101 recognizes that data that cannot be easily predicted by the trained model with a high degree of certainty is to be processed. The information processing apparatus 101 therefore controls the first candidate and the second candidate to be placed apart from each other.

In contrast, when a series of label candidates is presented as described above, a situation is assumed in which the user selects a plausible candidate at first glance without checking the first candidate and the second candidate that are placed apart from each other. If such a situation occurs frequently, a large number of pieces of learning data to which a label less relevant to a target model are added to a data set, which leads to a degradation in the quality of the data set.

In view of the above-described circumstances, the information processing apparatus 101 according to the present exemplary embodiment controls the placement for display of each candidate such that the first candidate and the second candidate are located close to each other, in the processing of step S406 illustrated in FIG. 4. The application of control processing described above enables the user to easily view both the first candidate and the second candidate. It is thereby possible to prevent at least the occurrence of a situation where the user checks only one of the candidates and selects the candidate without checking the other candidate.

It may be appropriately selected whether to apply the processing according to the present exemplary embodiment or the processing according to the first exemplary embodiment in view of, for example, the contents of the annotation operation, and skill and character of the user, in the processing of step S406 illustrated in FIG. 4.

As another example, the information processing apparatus 101 may dynamically select whether to apply the processing according to the present exemplary embodiment or the processing according to the first exemplary embodiment based on based on statistical selection information through the annotation operation. As a specific example, assume that the information processing apparatus 101 detects that the first candidate having display information placed at the left end is selected more frequently than the second candidate having display information placed at the right end with a statistical superiority, when the processing according to the first exemplary embodiment is applied. In this case, the information processing apparatus 101 may change the processing performed in step S406 to the processing according to the present exemplary embodiment, assuming that the user may select a candidate displayed at the left end more frequently.

As described above, the information processing apparatus 101 according to the present exemplary embodiment controls the first candidate and the second candidate to be placed at positions close to each other when data that cannot be easily predicted by the trained model with a high degree of certainty is to be processed. Thus, adverse effects of degradation in the quality of a data set can be reduced even in a case where a candidate different from a candidate intended by the user is accidentally selected under a situation where it is difficult for the user to select a series of label candidates after checking the candidates. Consequently, the information processing apparatus 101 according to the present exemplary embodiment can maintain a high operation speed for the annotation operation performed by the user and reduce adverse effects of degradation in the quality of a data set due to erroneous selection of candidates in a more preferred mode.

An example of a UI according to a third exemplary embodiment will now be described with reference to FIG. 6. In the first and second exemplary embodiments described above, the information processing apparatus 101 places a series of label candidates in a one-dimensional manner at a predetermined location on the screen. In the third exemplary embodiment, the information processing apparatus 101 controls the placement for display of a series of label candidates flexibly depending on a similarity (e.g., word similarity) between candidates. Specifically, in an example illustrated in FIG. 6, the information processing apparatus 101 controls an interval between a plurality of candidates depending on the similarity between the plurality of candidates.

A screen 601 is an example of a screen to be presented to the user through the output unit 113 by the information processing apparatus 101. Areas 602 to 608 on the screen 601 correspond to the areas 502 to 508, respectively, on the screen 501 illustrated in FIG. 5. Buttons 609 and 610 on the screen 601 correspond to the buttons 509 and 510, respectively, on the screen 501. The screen 601 is substantially the same as the screen 501, except for the contents of information displayed in the areas 606, 607, and 608. Thus, the present exemplary embodiment focuses on control processing for displaying information in the areas 606, 607, and 608, and the other components of the screen 601 are substantially the same as those of the screen 501, and thus the detailed descriptions thereof are omitted.

The area 606 is an area in which candidates for a label to be added as an annotation to the object displayed in the area 603 are presented. A series of candidates for which display information is displayed in the area 606 is similar to those in the area 506 illustrated in FIG. 5, except that "truck" and "house" are placed apart from each other. Specifically, the information processing apparatus 101 according to the present exemplary embodiment controls the distance between the display information corresponding to the candidates depending on the distance between the word vector for the first candidate (standard-sized car) and the word vector for each of the other candidates (truck, house, and building). The distance between the word vectors is calculated in the processing of step S402 illustrated in FIG. 4.

Figure 6:
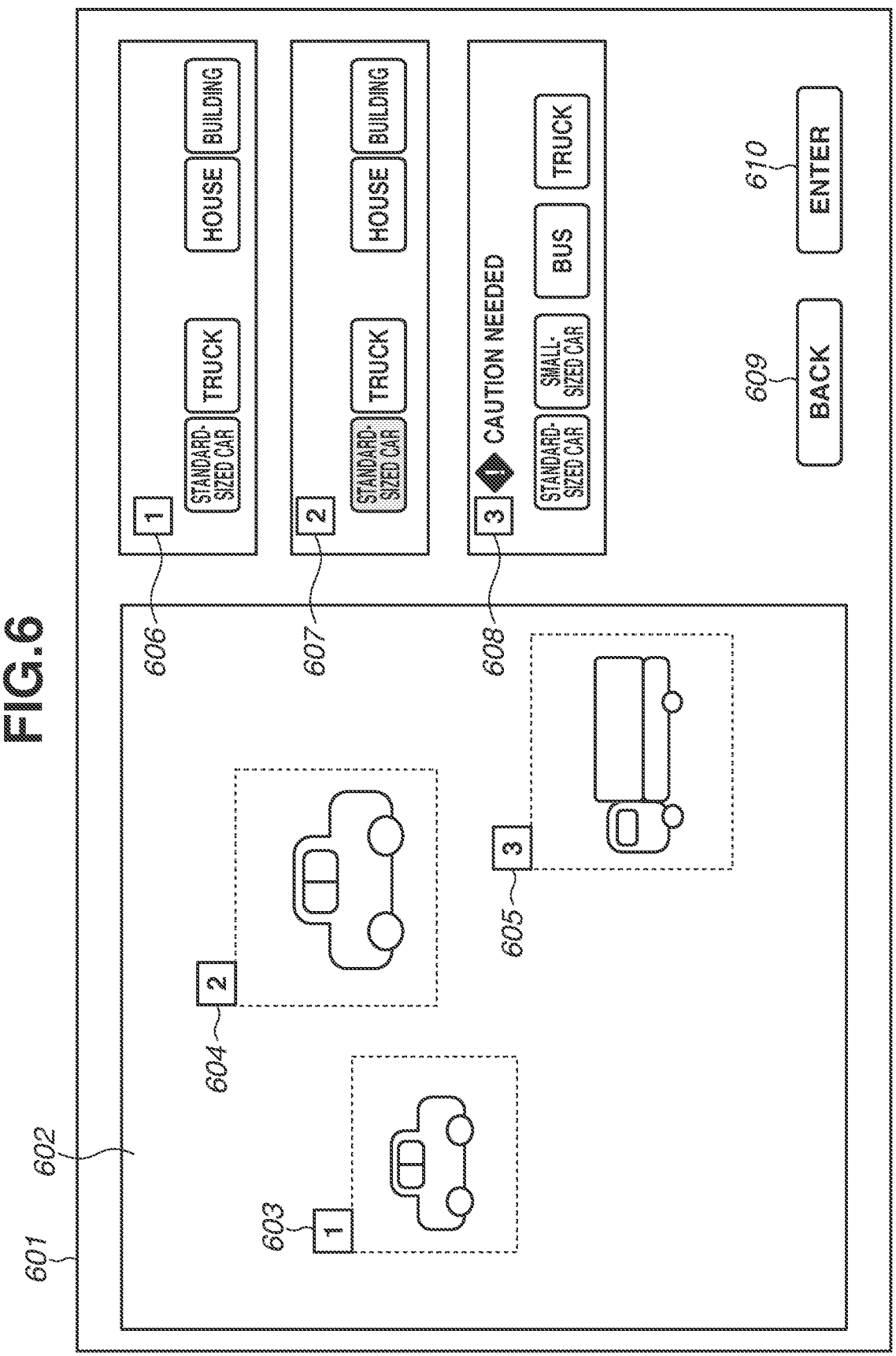
FIG. 6 illustrates another example of the screen to be displayed through the output unit by the information processing apparatus.

In the example illustrated in FIG. 6, assume that the distance between the word vector for "standard-sized car" and the word vector for "truck" is small, and the distance between the word vector for "standard-sized car" and the word vector for each of "house" and "building" is larger than the distance between the word vector for "standard-sized car" and the word vector for "truck". The distance between the word vector for "house" and the word vector for "building" is small.

In the area 606, "truck" is thus placed in next to "standard-sized car", and "house" and "building" are placed apart from "standard-sized car" depending on the distance between the word vector for "standard-sized car" and the word vector for each of "house" and "building". Further, since the distance between the word vector for "house" and the word vector for "building" is small, "house" and "building" are placed at positions close to each other.

The area 607 is an area in which candidates for a label to be added as an annotation to the object displayed in the area 604 are presented.

Similarly to the series of label candidates displayed in the area 507 illustrated in FIG. 5, in the series of label candidates displayed in the area 607, the first candidate "standard-sized car" has an extremely high score, and thus it is highly likely that the object displayed in the area 604 corresponds to the first candidate "standard-sized car". Thus, the first candidate "standard-sized car" is displayed in a state where the first candidate is selected in default settings. Similarly to the series of label candidates displayed in the area 606, in a series of label candidates displayed in the area 607, the distance between display information associated with a plurality of candidates is controlled depending on the distance between word vectors for the plurality of candidates.

The area 608 is an area in which candidates for a label to be added as an annotation to the object displayed in the area 605 are presented.

Similarly to the series of label candidates displayed in the area 508 illustrated in FIG. 5, in a series of label candidates displayed in the area 608, the first candidate "standard-sized car" has a highest score and the difference between the score for the first candidate "standard-sized car" and the score for the second candidate "truck" is small. Thus, a mark for calling attention to the user and a message "caution needed" are displayed in the area 608 as notification information. As a series of label candidates to be displayed in the area 608, "standard-sized car", "small-sized car", "bus", and "truck" are selected. Since these candidates are vehicles, the distance between word vectors for these candidates is relatively small. The information processing apparatus 101 therefore controls the placement for display of each candidate such that the series of label candidates is placed at positions close to each other depending on the distance between word vectors for the candidates.

As described above, the information processing apparatus 101 according to the present exemplary embodiment controls the distance between a series of label candidates depending on the distance between word vectors for the candidates. Thus, since a plurality of candidates that are far from each other in meaning are placed apart from each other, it is possible to reduce the possibility of occurrence of a situation where a candidate different from a candidate intended by the user is accidentally selected.

Figure 7:
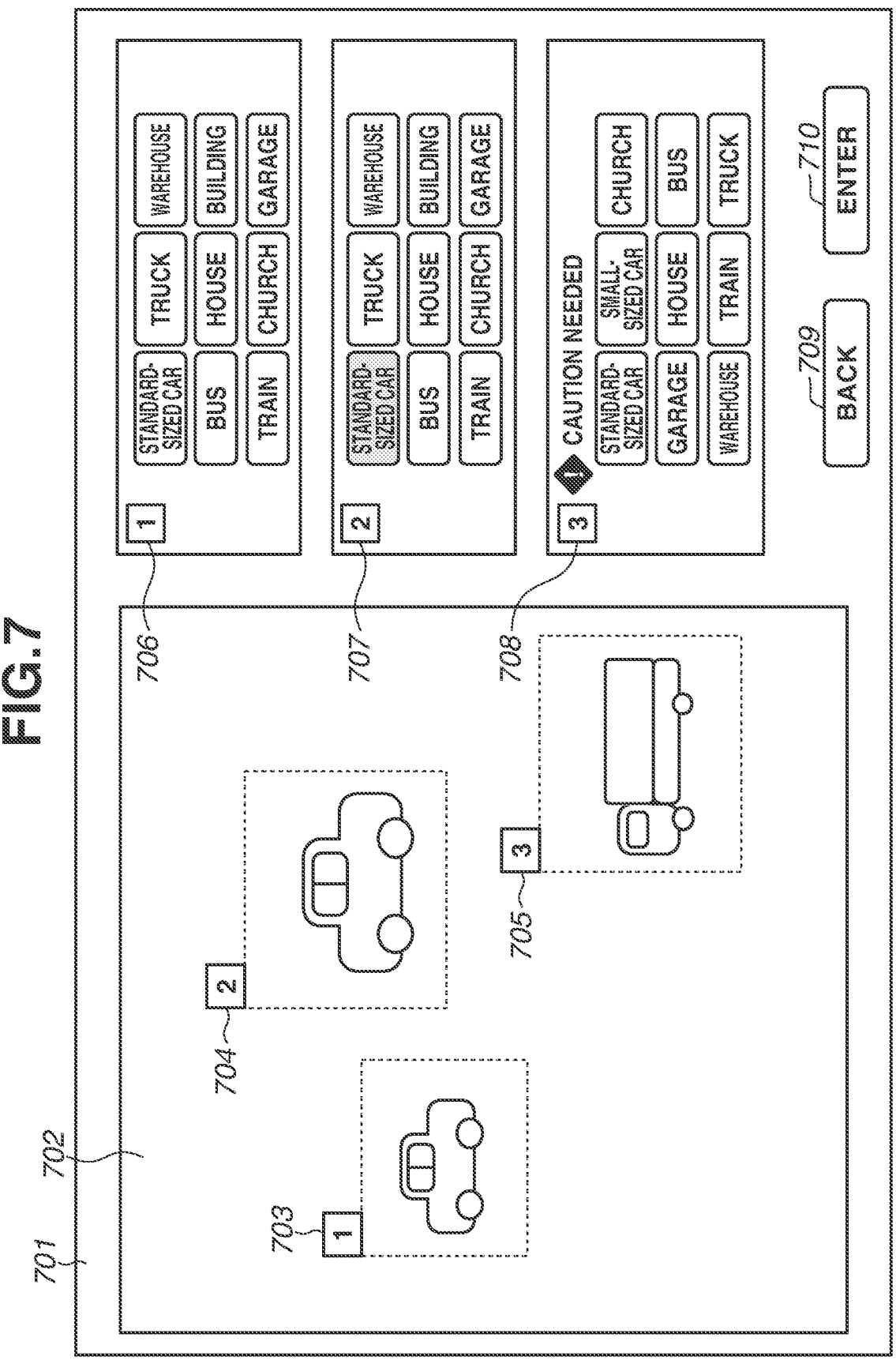
FIG. 7 illustrates still another example of the screen to be displayed through the output unit by the information processing apparatus.

An example of a UI according to a fourth exemplary embodiment will now be described. In the first to third exemplary embodiments described above, a series of candidates for a label to be added as an annotation to target data is placed in a one-dimensional manner in a predetermined direction (e.g., in a lateral direction). In contrast, the method in which the information processing apparatus 101 according to an exemplary embodiment of the present disclosure controls the placement for display of a series of label candidates is not limited to the method of placing candidates in a one-dimensional manner in the predetermined direction, and a variety of placement methods can be applied. Thus, in the fourth exemplary embodiment, an example where a series of candidates is placed in a two-dimensional manner when the information processing apparatus 101 displays a series of label candidates will be described with reference to FIG. 7.

A screen 701 is an example of a screen to be presented to the user through the output unit 113 by the information processing apparatus 101. Areas 702 to 708 on the screen 701 correspond to the areas 502 to 508, respectively, on the screen 501 illustrated in FIG. 5. Buttons 709 and 710 on the screen 701 correspond to the buttons 509 and 510, respectively, on the screen 501. The screen 701 is substantially the same as the screen 501, except that the contents of information display in the areas 706, 707, and 708 are different from those of the screen 501. Thus, the fourth exemplary embodiment focuses on control processing for displaying information in the areas 706, 707, and 708, and the other components of the screen 701 are substantially the same as those of the screen 501, and thus the detailed descriptions thereof are omitted.

The area 706 is an area in which candidates for a label to be added as an annotation to the object displayed in the area 703 are presented. In the area 706, a series of label candidates is displayed in a matrix of three rows and three columns.

As for the object displayed in the area 703, similarly to the object indicated by the area 503 illustrated in FIG. 5, it is estimated that the probability (score) indicating that the object corresponds to the "standard-sized car" is highest as an estimation result of label candidates by the trained model. Based on the above-described premises, the information processing apparatus 101 according to the present exemplary embodiment places a candidate, the meaning of which is close to the meaning of the word "standard-sized car", in the vicinity of "standard-sized car" in the area 706. In a case where a semantic distance between a plurality of candidates is represented in a two-dimensional manner, for example, the idea of Manhattan distance may be used.

The area 707 is an area in which candidates for a label to be added as an annotation to the object displayed in the area 704 are presented.

Similarly to the series of label candidates displayed in the area 507 illustrated in FIG. 5, in a series of label candidates displayed in the area 707, the first candidate "standard-sized car" has an extremely high score, and thus it is highly likely that the object indicated by the area 704 corresponds to the first candidate "standard-sized car". Thus, the first candidate "standard-sized car" is displayed in a state where the first candidate is selected in default settings.

The area 708 is an area where candidates for a label to be added as an annotation to the object displayed in the area 705 are presented.

Similarly to the series of label candidates displayed in the area 508 illustrated in FIG. 5, in a series of label candidates displayed in the area 708, the first candidate "standard-sized car" has a highest score and the difference between the score of the first candidate "standard-sized car" and the score for the second candidate "truck" is small. In other words, the trained model estimates that the probability that the object displayed in the area 705 corresponds to the "standard-sized car" is high and the probability that the object displayed in the area 705 corresponds to the "truck" is also high. Thus, a mark for calling attention to the user and a message "caution needed" are displayed in the area 708 as notification information. In the series of label candidates, "standard-sized car" is placed at an upper left end, and "truck" is placed at a lower right end in the area 708 so that "standard-sized car" and "truck" are placed with a largest Manhattan distance. The placement of candidates other than "standard-sized car" and "truck" is controlled such that candidates having a higher word similarity are placed at positions closer to each of "standard-sized car" and "truck".

As described above, the method in which the information processing apparatus 101 according to the present exemplary embodiment places a series of label candidates is not limited only to the method of placing the candidates in a one-dimensional manner in the predetermined direction. For example, the candidates can be placed in a two-dimensional manner. The application of control processing as described above makes it possible to effectively display a large number of candidates within the screen.

As described above, the information processing apparatus 101 according to the present exemplary embodiment controls the display of candidates for a label to be added as an annotation to target data by using the estimation result by the trained model. The application of control processing as described above makes it possible to reduce the possibility of occurrence of a situation where a candidate that is different from a candidate intended by the user is accidentally selected.

Even if the user accidentally selects an erroneous candidate due to a mistake in operation or the like, the placement of candidates is controlled such that, for example, candidates with similar meanings are selected, thereby making it possible to reduce adverse effects of degradation in the quality of a data set due to erroneous labeling.

In general, if learning data used for machine learning is not properly labeled, the generalization performance of the machine learning model tends to deteriorate. In contrast, the information processing apparatus 101 according to the present exemplary embodiment can reduce the possibility of occurrence of a situation where the user may perform erroneous labeling. It can therefore be expected that the advantageous effect of reducing the possibility of degradation in the generalization performance of the machine learning model can be obtained.

The functional configuration of the information processing apparatus 101 described above with reference to FIG. 1 is merely an example. The configuration of the information processing apparatus 101 is not limited as long as the functions of the information processing apparatus 101 can be implemented.

For example, each function of the information processing apparatus 101 can be implemented by a plurality of devices that operate in cooperation with one another. In this case, some of the functions of the information processing apparatus 101 and the other functions of the information processing apparatus 101 may be implemented by different devices. As a specific example, functions for estimating candidates for a label to be added as an annotation to target data and functions for controlling the display of a series of label candidates may be implemented by different devices. A processing load on at least some of the functions of the information processing apparatus 101 may be distributed to a plurality of devices.

The type of a network for connecting the plurality of devices to each other is not limited as long as the plurality of devices can transmit and receive information and data. The positions where the devices are installed are not limited.

A program code to be installed in a computer to implement the processing according to the present exemplary embodiment using the computer corresponds to one of the exemplary embodiments of the present disclosure. The functions according to the exemplary embodiments described above may be implemented by processing in which a part or all of the actual processing is executed by an OS or the like running on the computer based on an instruction included in a program read by the computer.

Any combination of the above-described exemplary embodiments and examples is also included in the exemplary embodiments of the present disclosure.

The above-described examples focus on the case where candidates with the top two scores are applied as the first candidate and the second candidate, but are not intended to limit the processing of the information processing apparatus 101 according to the present exemplary embodiment. In other words, the first candidate and the second candidate are candidates to be presented to the user, and the candidates are not limited to the candidates with the top two scores as long as the candidates have different scores.

The above-described examples focus on the case where the machine learning model is used to obtain a series of candidates for a label to be added as an annotation to target data and a score representing a likelihood of each of the series of candidates. However, the method for obtaining a series of label candidates and a score representing a likelihood of each of the candidates for the label is not limited as long as the series of candidates and the score can be obtained. As a specific example, if target data indicates an image, a feature amount may be extracted by analyzing the image, and candidates for a label to be added to a subject captured in the image, and a score for each of the candidates may be obtained based on a result of extraction of the feature amount. When target data indicates a document, natural language processing, such as syntactical analysis or semantic analysis, may be performed on the document, to thereby obtain candidates for a label to be added to information (e.g., a word or clause) included in the document and a score for each of the candidates.

Other Embodiments

Embodiment(s) of the present disclosure can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-230276, filed Dec. 20, 2019, which is hereby incorporated by reference herein in its entirety.

What is claimed is:

1. An information processing apparatus comprising:
One or more memories storing one or more programs; and
one or more processors that, upon executing of the stored one or more programs, configures the one or more processors to function as:
  an obtaining unit configured to obtain an estimation result of a score representing a likelihood that each of a first candidate label and a second candidate label is a correct labels for data used to train a learning model; and
  a control unit configured to perform control processing that
    determines, for the first candidate label, first display information representing a first position within a user interface generated for display on a display device, and
    determines, for the second candidate label, second display information representing a second position within a user interface generated for display on the display device, wherein the determined first display information and second display information are determined based on respectively obtained likelihood scores,
    generates the user interface being displayed based on the determined first display information and determined second display information and controls a distance between the display position in the user interface of the first candidate label and the display position in the user interface of the second candidate label relative to a display position of another candidate label based on a linguistic similarity between the first candidate label or the second candidate label and the another candidate,
  wherein when it is determined that difference between the likelihood score of the first candidate label and second candidate label are less than a first threshold indicating that a prediction certainty is low, the determined first display position is a position at a predetermined distance from the second display position within the user interface, and each of the determined first display position and determined second display position is within a vicinity of the display position within the user interface of the another candidate label.

2. The information processing apparatus according to claim 1, wherein execution of the one or more stored programs further configures the one or more processors to operate as an estimation unit configured to estimate, based on a trained model, the score for each of the first candidate and the second candidate for the label to be added as the annotation to second data to be annotated, the trained model being constructed using, as training data, first data to which the label is added as the annotation,
  wherein the obtaining unit obtains the score estimated by the estimation unit for each of the first candidate and the second candidate.

3. The information processing apparatus according to claim 1, wherein the control unit controls a distance between the first display information and the second display information depending on a difference in the score between the first candidate and the second candidate.

4. The information processing apparatus according to claim 3, wherein in a case where the difference is less than or equal to a first threshold, the control unit controls the first display information and the second display information to be displayed at positions apart from each other.

5. The information processing apparatus according to claim 4, wherein in a case where the difference exceeds a second threshold greater than the first threshold, the control unit controls the first display information and the second display information to be displayed in a state where one of the first display information and the second display information associated with a candidate of the first candidate and the second candidate having a higher score is selected.

6. The information processing apparatus according to claim 4, wherein the control unit controls predetermined notification information to be notified in a case where the difference is less than or equal to the first threshold.

7. The information processing apparatus according to claim 4, wherein in a case where the difference exceeds the first threshold, the control unit controls, depending on a word similarity between the first candidate and another candidate, a distance between the first display information and display information about the other candidate.

8. The information processing apparatus according to claim 4, wherein in a case where the difference exceeds the first threshold, the control unit controls third display information associated with a third candidate similar to a candidate associated with display information, which is at least one of the first display information and the second display information, to be displayed near the display information.

9. The information processing apparatus according to claim 8, wherein:

the label includes at least character information;
the obtaining unit obtains a calculation result of a linguistic similarity between the third candidate and each of the first candidate and the second candidate; and
the control unit controls the third display information to be displayed near the display information corresponding to the candidate, whichever of the first candidate and the second candidate has a higher linguistic similarity to the third candidate.

10. An information processing method comprising:
obtaining an estimation result of a score representing a likelihood that each of a first candidate label and a second candidate label is a correct label for data used to train a learning model;
determining, for the first candidate label, first display information representing a first position within a user interface generated for display on a display device;
determining, for the second candidate label, second display information representing a second position within a user interface generated for display on the display device, wherein the determined first display information and second display information are determined based on respectively obtained likelihood scores; and
generating the user interface being displayed based on the determined first display information and determined second display information control a distance between the display position in the user interface of the first candidate label and the second candidate label relative to a display position of another candidate based on a linguistic similarity between the first candidate label or the second candidate label and the another candidate,
  wherein when it is determined that difference between the likelihood score of the first candidate label and second candidate label are less than a first threshold indicating that a prediction certainty is low, the determined first display position is a position at a predetermined distance from the second display position within the user interface, and each of the determined first display position and determined second display position is within a vicinity of the display position within the user interface of the another candidate label.

11. The information processing method according to claim 10, further comprising estimating, based on a trained model, the score for each of the first candidate and the second candidate for the label to be added as the annotation to second data to be annotated, the trained model being constructed using, as training data, first data to which the label is added as the annotation,
  wherein the obtaining obtains the estimated score for each of the first candidate and the second candidate.

12. The information processing method according to claim 10, wherein the controlling controls a distance between the first display information and the second display information depending on a difference in the score between the first candidate and the second candidate.

13. The information processing method according to claim 12, wherein in a case where the difference is less than or equal to a first threshold, the controlling controls the first display information and the second display information to be displayed at positions apart from each other.

14. The information processing method according to claim 13, wherein in a case where the difference exceeds a second threshold greater than the first threshold, the controlling controls the first display information and the second display information to be displayed in a state where one of the first display information and the second display information associated with a candidate of the first candidate and the second candidate having a higher score is selected.

15. The information processing method according to claim 13, wherein the controlling controls predetermined notification information to be notified in a case where the difference is less than or equal to the first threshold.

16. The information processing method according to claim 13, wherein in a case where the difference exceeds the first threshold, the controlling controls, depending on a word similarity between the first candidate and another candidate, a distance between the first display information and display information about the other candidate.

17. The information processing method according to claim 13, wherein in a case where the difference exceeds the first threshold, the controlling controls third display information associated with a third candidate similar to a candidate associated with display information, which is at least one of the first display information and the second display information, to be displayed near the display information.

18. The information processing method according to claim 17, wherein:
   the label includes at least character information;
   the obtaining obtains a calculation result of a linguistic similarity between the third candidate and each of the first candidate and the second candidate; and
   the controlling controls the third display information to be displayed near the display information corresponding to the candidate, whichever of the first candidate and the second candidate has a higher linguistic similarity to the third candidate.

19. A non-transitory computer-readable storage medium storing instructions that, when executed by a computer, causes the computer to perform a method, the method comprising:

obtaining an estimation result of a score representing a likelihood that each of a first candidate label and a second candidate label is a correct label for data used to train a learning model;

determining, for the first candidate label, first display information representing a first position within a user interface generated for display on a display device;

determining, for the second candidate label, second display information representing a second position within a user interface generated for display on the display device, wherein the determined first display information and second display information are determined based on respectively obtained likelihood scores; and generating the user interface being displayed based on the determined first display information and determined second display information control a distance between the display position in the user interface of the first candidate label and the second candidate label relative to a display position of another candidate based on a linguistic similarity between the first candidate label or the second candidate label and the another candidate, wherein when it is determined that difference between the likelihood score of the first candidate label and second candidate label are less than a first threshold indicating that a prediction certainty is low, the determined first display position is a position at a predetermined distance from the second display position within the user interface, and each of the determined first display position and determined second display position is within a vicinity of the display position within the user interface of the another candidate label.

* * * * *